United States Patent [19]

Gappa et al.

[11] 4,007,116
[45] Feb. 8, 1977

[54] PROCESS FOR THE PURIFICATION OF WASTE WATERS WITH ACTIVATED CARBON

[75] Inventors: Günther Gappa, Gelsenkirchen-Buer; Harald Jüntgen, Essen; Jurgen Klein, Essen; Jürgen Reichenberger, Essen, all of Germany

[73] Assignee: Bergwerksverband GmbH, Essen, Germany

[22] Filed: July 23, 1975

[21] Appl. No.: 598,385

[30] Foreign Application Priority Data

July 31, 1974 Germany .......................... 2436792

[52] U.S. Cl. ................................. 210/33; 210/39
[51] Int. Cl.² ........................................ B01D 15/00
[58] Field of Search ................ 210/27, 33, 39, 40, 210/66, 81; 252/419

[56] References Cited

UNITED STATES PATENTS

| | | | |
|---|---|---|---|
| 2,933,454 | 4/1960 | Repik et al. | 252/419 |
| 2,969,297 | 1/1961 | Grosvenor, Jr. | 210/40 X |
| 3,244,621 | 4/1966 | Bouthilet | 210/39 X |
| 3,408,289 | 10/1968 | Gustafson | 210/27 |
| 3,436,344 | 4/1969 | Canning et al. | 210/39 |
| 3,763,040 | 10/1973 | Timpe et al. | 210/27 |
| 3,816,338 | 6/1974 | Corson | 210/40 X |

Primary Examiner—Frank A. Spear, Jr.
Assistant Examiner—Ethel R. Cross
Attorney, Agent, or Firm—Michael J. Striker

[57] ABSTRACT

A process for the purification of waste water containing dissolved organic carbon contaminants which comprises a. passing the waste water upwardly through a column of activated carbon particles, b. determining the total organic carbon content of the water before it enters the column and simultaneously at a location that is between 30 and 70% of the total height of the carbon particles in the column, c. continuously withdrawing the spent carbon particles from the bottom of the column at such a rate as to maintain an essentially constant preselected difference between the total organic carbon content of the water as it enters the column and at the preselected location that is between 30 and 70% of the height of the carbon particles in the column, d. continuously introducing fresh activated carbon particles or reactivated carbon particles at the top of the column at such a rate as to compensate for those withdrawn at the bottom of the column, and e. removing the purified water at the top of the column.

12 Claims, 1 Drawing Figure

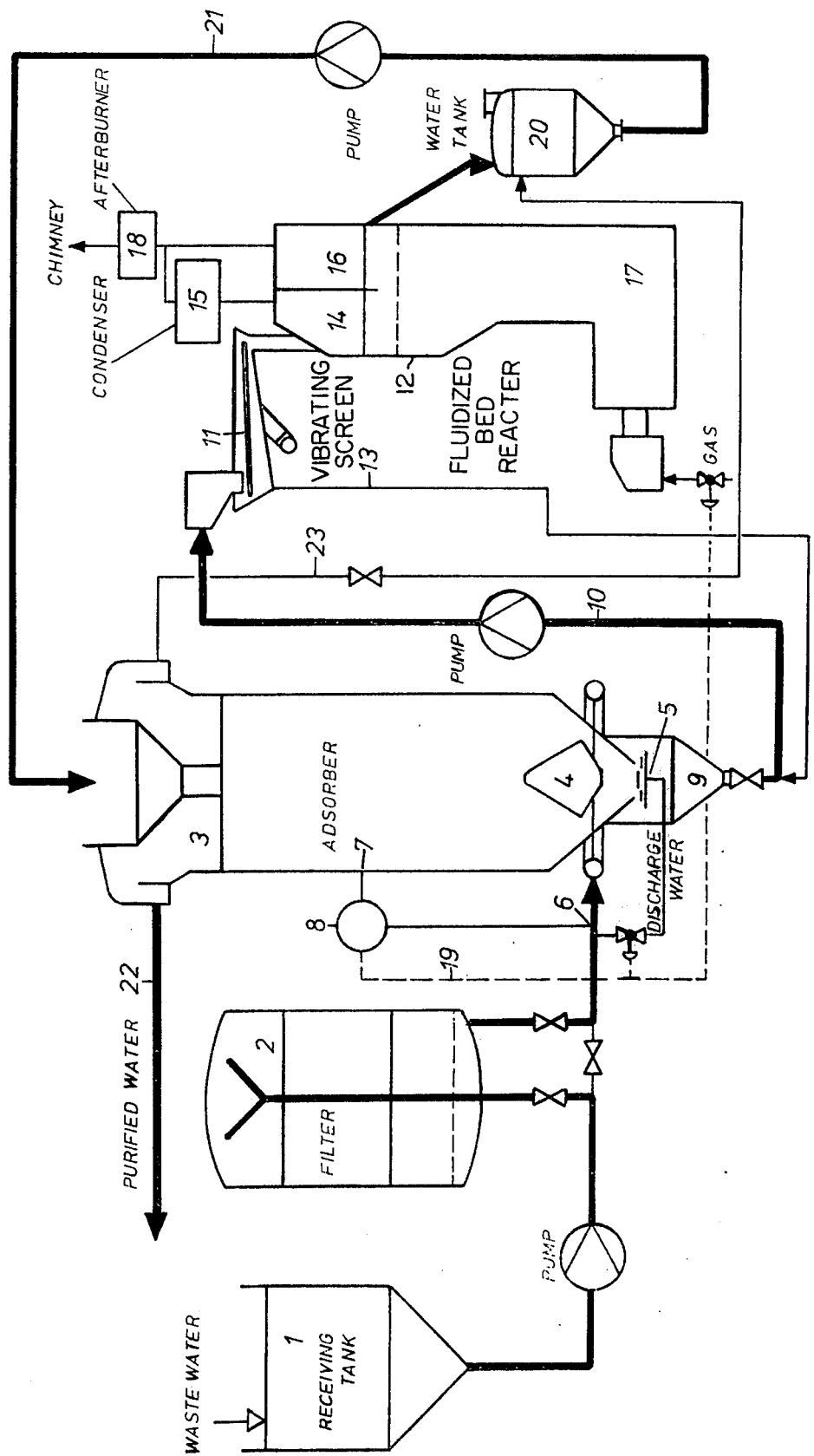

PROCESS FOR THE PURIFICATION OF WASTE WATERS WITH ACTIVATED CARBON

BACKGROUND OF THE INVENTION

Activated carbon particles have long been used as adsorbents for gases and for adsorbing liquid and solid organic compounds from liquids in which they are dissolved. They have also been used in the purification of waste waters contaminated with large amounts of dissolved organic matter and many processes for such purpose have heretofore been described. However, each of these prior processes has one or more disadvantages that make it less than eminently suitable for the treatment of industrial waste waters containing high concentrations of dissolved organic contaminants so that the water may be purified at the lowest possible cost.

At least a portion of the organic contaminants that are adsorbed by the activated carbon in processes are generally capable of being desorbed and recovered, if desired, by heating the carbon in the absence of oxygen or oxidizing gases at a temperature between 300° and 500° C. On the other hand, to remove contaminants that cannot be desorbed in this manner or that are decomposed during this treatment forming a carbonaceous residue on the surface of the activated carbon, the spent and thus pretreated activated carbon must be treated with steam, for example, at a temperature of approximately 800° C in order to reactivate or regenerate the carbon for reuse as an adsorbent. During such conventional regeneration treatments, a portion of the activated carbon, amounting to between approximately 5 and 15% by weight of the carbon, upon which such organic compounds had been adsorbed, is converted to volatile products which thereby represent a loss of the carbon. The high loss of carbon that occurs during such generation treatments is obviously a great disadvantage of such processes.

The purification of industrial waste waters containing high concentrations of dissolved organic contaminants by such methods is not practical because the activated carbon quickly becomes saturated with the organic contaminants and is thus spent and does not adsorb any further quantities thereof, as a result of which it must be frequently regenerated, with the accompanying high losses that are incidental to such regeneration treatments.

The activated carbon particles are also often subjected to regeneration before they have been completely spent, that is, have not adsorbed the maximum amount of organic contaminants that they were capable of adsorbing, which also represents a waste or loss.

SUMMARY OF THE INVENTION

In the processes of the present invention, waste water is purified by passing it upwardly through a bed of activated carbon particles confined in a column or adsorber while a portion of the spent carbon particles is continuously withdrawn from the bottom of the column. The carbon particles that are thus withdrawn are thermally reactivated and returned to the top of said column to replace the spent carbon particles that were thus withdrawn at the bottom of the said column. In general, in the processes of the present invention, the fresh activated carbon particles are moved through an adsorber from its top to its bottom while the waste water is passed upwardly therethrough. The water thus flows countercurrently to the movement of the carbon particles in the column. During this process, the contaminants, particularly the dissolved organic substances, are adsorbed from the water by the activated carbon.

In making most efficient use of activated carbon as an adsorbent for organic contaminants, the carbon particles should have adsorbed the maximum amount of organic contaminants that they are capable of adsorbing before being subjected to regeneration. This desirable object is achieved in the processes of the present invention by adjusting and controlling the rate at which the spent carbon particles are continuously withdrawn or discharged at the bottom of the column and are replaced by freshly regenerated activated carbon particles at the top of the column. This rate is determined by observing the differences between the organic carbon content of the incoming waste water at the inlet to the adsorber or column and the organic carbon content of the water in the adsorber or column at a level corresponding to between 30 and 70%, and preferably the midpoint, of the height of the column of carbon particles in the adsorber or column. In this manner, it surprisingly is also possible to ensure that the spent carbon particles that are removed or discharged at the bottom of the column have adsorbed the maximum or at least an optimal maximum amount of organic contaminants from the waste water. By the term optimal maximum as used herein is to be understood that amount beyond which it is no longer economically feasible to operate the process, which amount may be slightly less than the maximal amount that the carbon particles could ultimately adsorb. Furthermore it is possible to control the temperature of the regeneration unit in such a manner that, in the case of a higher throughput of carbon particles, the temperature therein is increased to compensate for the shorter residence period of the carbon particles therein. In this manner, it surprisingly is possible to minimize the loss of carbon particles and to simultaneously adjust the operation to the changes in concentration and amount of the waste water passing through the adsorber.

BRIEF DESCRIPTION OF THE DRAWING

The drawing is a flow sheet of a process in accordance with the present invention which is described hereinafter in connection with the detailed description which follows.

DETAILED DESCRIPTION AND PREFERRED EMBODIMENTS OF THE INVENTION

The processes of the present invention are described further in connection with the drawing and Examples which follow, which were selected solely for purposes of illustration and consequently are not to be construed as restrictive of the invention or its scope.

Waste water is passed by means of a pump from a receiving tank 1 to a multilayer filter 2 in which any solid particles in the water are separated therefrom. The filtrate is then passed upwardly into an adsorber or column 3 that is filled with activated charcoal or carbon particles through a stationary conical sprinkler or distributor 4 located in the lower portion of the adsorber 3 so that the water is distributed equally over the entire cross-section of the adsorber.

The activated carbon is circulated downwardly from the top of the adsorber 3 to a constricted outlet 5 at the bottom of the adsorber 3 at a rate of flow or speed that is controlled by the difference in the content of total organic carbon in the water before it is pumped into the adsorber 3 at the location 6 and the content of total organic carbon in the water at the midpoint 7 of the adsorber or at a location that is between 30 and 70% of the height of the column.

The contents of total organic carbon in the flowing water stream are determined by conventional means that are described hereinafter from a control center which is represented in the drawing by the circle 8, which may also include other means for adjusting and controlling the flow of the various circulating substances by actuating valves and pumps that are represented in the drawing.

Spent activated carbon particles that are discharged or withdrawn at the outlet 5 at the bottom of the adsorber 3 pass into a chamber 9 at the bottom of the adsorber 3 in which they are suspended in water to form a slurry that is then conveyed hydraulically through a conduit 10 onto a vibrating screen 11 where the particles are separated from the accompanying water and then conveyed into a fluidized bed reactor or oven 12 that is divided into several interconnecting compartments. The water that is thus separated on the screen 11 is returned through a conduit 13 to the bottom outlet of the adsorber 3 and reused for conveying further quantities of spent carbon particles in the form of a slurry to the fluidized bed reactor 12. In the compartment 14 of the fluidized bed reactor 12, the fluidized spent carbon particles are heated to a temperature of approximately 400° C. Water and any adsorbed organic compounds that are thus volatilized are separated from the carbon particles and are condensed and collected in the condenser 15. The fluidized carbon particles are then conveyed into compartment 16 where they are heated to a temperature of approximately 780° C to burn off any remaining adsorbed organic compounds that had not previously been desorbed or removed or decomposed into adsorbed carbonaceous residue thereby regenerating the activated carbon.

The temperatures in the various compartments of the fluidized bed reactor 12 are maintained by the burning of a combustible gas in a burner in the combustion chamber 17 of the fluidized bed reactor 12 and the combusted gas together with gases produced in the compartment 16 are passed to an afterburner 18 and vented to a chimney that is not shown. The valves which control the flow of gas that is required for the combustion in the combustion chamber 17 and the flow of water that is required for producing the slurry in chamber 9 are actuated and controlled by conventional means included in the control center 8 which are connected to circle 8 as shown by the dotted line 19.

The spent carbon particles that have thus been reactivated or regenerated in the fluidized bed reactor 12 are then discharged into a water tank 20 where they are suspended and the resulting slurry of fresh reactivated carbon particles is conveyed and returned to the adsorber 3 through a conduit 21 opening to the top of the adsorber 3. The purified water is discharged from the adsorber 3 through a conduit 22 and a portion thereof is supplied to the water tank 20 through conduit 23.

The rate at which the regenerated activated carbon is returned to the adsorber 3 is dependent upon the amount of spent carbon particles that are withdrawn from the adsorber which in turn is dependent upon the difference between the total organic carbon contents of the water circulating through the sprinkler 4 and past the location 7 of the adsorber 3 as determined at the control center 8.

In the processes of the present invention the content of total dissolved organic impurities or contaminants in the waste water is determined continuously at at least two specified locations, namely, at or before the inlet at which the water is pumped into the adsorber and at a location that is between 30 and 70% of the height of the column of carbon particles in the adsorber. In this determination the organic carbon in the water is catalytically oxidized to carbon dioxide with air or oxygen and the carbon dioxide is determined by means of a suitable measuring instrument, for example, an infrared analyzer. The difference between the total organic carbon contents of the water at each of these two locations is then used as an index value by means of which the rate at which the spent activated carbon that is to be withdrawn or discharged at the bottom of the column or the adsorber at any time is established. If the index value increases during the operation of the process, indicating that the activated carbon particles are being spent too quickly, the rate at which the spent carbon particles are withdrawn at the bottom of the bed or column is increased and conversely, if the index value decreases, the rate at which the spent carbon particles are withdrawn is decreased. Normally, the process will be operated first to maintain at the midpoint of the bed or column, or at any other intermediate location within the specified 30 to 70% range of the height of the column, a constant preselected content of total organic carbon, in which case the rate of removal of the spent carbon particles will be changed only when the content of total organic carbon of the water at the inlet changes.

Because of the continuous determination of the difference between the contents of total organic carbon in the water at the inlet and at the specified intermediate location in the column, it is possible to maintain with greater precision the rate at which the activated carbon particles are moved in the bed or column and thereby insure that the carbon particles that are withdrawn or discharged at the bottom of the column have adsorbed an optimal maximal amount of organic contaminants and are in that sense completely spent, and that the water discharged from the adsorber has the desired preselected reduced content of total organic carbon.

Industrial waste waters from different sources will contain different kinds and concentrations of comtaminants which contaminants may be adsorbed to differing degrees by the activated carbon particles that are used. The maximum amounts of such contaminants that the carbon particles are capable of adsorbing may also differ widely. The volume of the stream of spent carbon particles, that is, the amount of carbon particles per unit of time that is to be regenerated will thus also fluctuate widely. Nevertheless the volume of the stream of spent carbon particles that is supplied in the regeneration or reactivation step must be kept constant. In order to compensate for these wide fluctuations, a bin or bunker for the spent carbon particles having a suitable size may be provided in known manner between the adsorber and the regeneration or reactivation unit.

The processes according to the present invention also have the particular advantage that the spent carbon particles, despite fluctuations in the quality and quantity of the waste water, can be passed directly into the fluidized bed reactor or other thermal regeneration unit without storage in an intermediate bunker or bin since, as described hereinafter, the amounts of the carbon particles that are charged to the regeneration unit can also be varied.

In accordance with the processes of the present invention, the operation of the adsorber and regeneration unit can be so controlled that the temperature in the regeneration step can be adjusted to compensate for the degree to which the carbon particles have been spent or saturated with the organic carbon contaminants beyond the preselected degree based upon the differences between the total organic carbon contents that are used as the index value. This alternative is possible since the regeneration temperature and the dwell period of the carbon particles in the regeneration step are interrelated and can be used to compensate for such fluctuations at least within certain limits.

The amount of water that is used to slurry the spent carbon particles that are conveyed to the regenerating unit, which also represents the amount of spent carbon particles, can also be used as a means of adjusting the regeneration temperature.

It is also possible to adjust the regeneration temperature without reference to the differences between the total organic carbon content of the waste water entering the adsorber and the total organic carbon content of the water at the location that is between 30 and 70% of the height of the carbon column that is used for regulating the speed at which the spent carbon particles are withdrawn from the adsorber.

In order to reduce to the lowest possible extent the losses of carbon particles that occur during their regeneration, the spent carbon particles are preliminarily desorbed by heating them at temperatures between 300° and 500° C in the absence of molecular oxygen or an oxidizing gas, thereby leaving only organic compounds that cannot be removed from the spent particles except by more drastic treatment such as burning or treatment with steam at temperatures up to 800° C.

Spent carbon particles, before being subjected to regeneration or reactivation, may be freed from adsorbed contaminants that can be desorbed at temperatures between 300° and 500° C by subjecting the spent carbon particles to a preliminary regeneration step at a temperature that has been adjusted accordingly.

Solid particles that are suspended in the waste water and which would contaminate the bed of activated carbon in the adsorber as well as produce a pressure drop therein, are preferably separated by filtration prior to the adsorption step. For this purpose a multilayer filter composed of a bottom layer of sand, the particles of which range in size from 0.8 to 1.2 millimeters in diameter, and an upper layer of carbon particles ranging in size from 3 to 4 millimeters, is suitable.

The activated carbon particles for use in the adsorber in the processes of the present invention may be of any size but preferably have a size of approximately 2 millimeters which is equivalent to particles that are held back on a No. 12 standard screen having 10.8 meshes per inch (4 meshes per centimeter) but pass through a No. 10 screen having 9.2 meshes per inch (3.5 meshes per centimeter). In special applications, especially if the adsorption rate is very slow, the diameter of the carbon particles can be reduced to between 0.5 and 1.0 millimeter. When particles of smaller size are used they have a tendency to clog the column and greater pressures are required to pump the waste water upwardly therethrough. Furthermore, such smaller particles complicate the subsequent recovery of the particles from the water in which the spent particles are dispersed and conveyed to the fluidized bed reactor for regeneration. Carbon particles having a diameter greater than 2 millimeters may be used but have the disadvantage over particles having a diameter of 2 millimeters in that the kinetics of adsorption are very slow and therefore a higher column of carbon particles is required. The size of the openings in the vibrating screen 11 are such as to hold back and retain the carbon particles in the slurry that is passed thereover.

EXAMPLE 1

Purification of a stream of cokery waste water having an average total organic carbon content of 1000 milligrams per liter and flowing at a rate of 20 cubic meters per hour.

The adsorber that is referred to in this Example has an internal diameter of 1.6 meters and is filled to a height of 2.4 meters with a column of activated carbon particles having an average diameter of 2 millimeters so that the pressure drop when waste water is passed therethrough at a speed of 10 meters per hour is 120 millimeters of water.

The content of total organic carbon in the water flowing through the adsorber is measured at the inlet and at the midpoint, that is, the midpoint or half the height of the column of activated carbon therein, and the rate of flow of the activated carbon through the adsorber is adjusted so that the content of total organic carbon in the water at the midpoint is one-half of its original value, namely, 500 milligrams per liter for waste water originally containing 1000 milligrams per liter, which rate on the average corresponds a speed of 0.13 meter per hour, corresponding to a stream of 260 liters per hour of activated carbon and a discharge rate of 7800 liters of water per hour. An average load of 70 kilograms (± 3%) of activated carbon per cubic meter is maintained in the adsorber and the total organic carbon content of the thus-purified water is of the order of 75 milligrams per liter, which represents a purification efficiency of 92.5%.

The spent carbon particles are withdrawn at a rate of 260 liters per hour from the bottom of the adsorber directly passed, without intermediate bunkering or binning, into a fluidized bed reactor in which the particles are maintained at a temperature of 820° C for an average dwell period of 30 minutes. During this regeneration treatment, the spent carbon particles lose between 1.5 and 2.2% of their original weight.

EXAMPLE 2

When the water that is treated has a total organic carbon content of 1200 milligrams per liter, and is treated in the same column as described in Example 1, the flow of the activated carbon must theoretically be increased to a speed of 0.15 meter per hour, corresponding to a stream of 295 liters per hour, and a water discharge rate of 8900 liters per hour. The load of activated carbon in the adsorber is also thereby increased to 75 kilograms (± 3%) per cubic meter. For the stream of particles having a flow rate of 295 liters per hour, a regeneration temperature of 840° C and an average dwell period of 26 minutes are required and the spent particles lose between 1.5 and 2.4% of their original weight during regeneration.

In both Example 1 and in this Example, the activity of the activated carbon is restored to within ± 2% of its initial activity.

EXAMPLE 3

Purification of a stream of waste water from a pulp and paper plant having an average total organic carbon content of 350 milligrams per liter and flowing at a rate of 100 cubic meters per hour.

The adsorber that is referred to in this Example has an internal diameter of 5 meters and is filled with a column of activated carbon particles having an average particle size of 2 millimeters to a height of 10 meters so that the pressure drop in the column when waste water is passed therethrough at a speed of 10 meters per hour is equivalent to 500 millimeters of water.

As in Example 2, the rate of flow of the activated carbon through the adsorber is adjusted so that the content of total organic carbon in the water at the midpoint of the adsorber is one-half of the original, namely, 175 milligrams per liter for waste water originally containing 350 milligrams per liter, which rate on the average corresponds to a speed of 0.38 meter per hour, corresponding to a flow of 750 liters per hour of activated carbon and a discharge rate of 7500 liters of water per hour. In this manner, an average load of 42 kilograms per cubic meter of activated carbon is maintained in the adsorber and a purification efficiency of 90% is achieved, so that the total organic carbon content of the purified water is 35 milligrams per liter.

A regeneration temperature of 760° C and a dwell period of 55 minutes are required in the fluidized bed reactor to regenerate the spent carbon particles and restore them to within ± 3% of their initial activity.

EXAMPLE 4

When the water that is to be treated has a total organic carbon content of 450 milligrams per liter, and is to be treated in the same column as described in Example 3, the speed of the activated carbon must theoretically be increased to 0.45 meter per hour corresponding to a flow of 880 liters per hour of activated carbon and a water discharge rate of 8800 liters per hour. The average dwell period in the fluidized bed reactor is reduced to 45 minutes and the reaction temperature is increased to 800° C. As a result of this regeneration treatment, between 1.3 and 2% of the original carbon particles are lost and the carbon is restored to within ± 3% of its initial activity.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A process for the purification of waste water containing dissolved organic carbon contaminants which comprises
   a. passing the waste water upwardly through a column of activated carbon particles,
   b. distributing the waste water equally over the entire cross-sectional area of the column of carbon particles,
   c. determining the total organic carbon content of the water before it enters the column and simultaneously at a location that is between 30 and 70% of the total height of the carbon particles in the column,
   d. continuously withdrawing spent carbon particles from the bottom of the column at such a rate as to maintain an essentially constant preselected difference between the total organic carbon content of the water as it enters the column and at the preselected location that is between 30 and 70% of the height of the carbon particles in the column,
   e. continuously introducing fresh activated carbon particles or reactivated carbon particles at the top of the column at such a rate as to compensate for those withdrawn at the bottom of the column, and
   f. recovering the thus-purified water at the top of the column.

2. A process as defined in claim 1 in which the spent carbon particles that are withdrawn at the bottom of the column are dispersed in water, the dispersion is conveyed hydraulically over a screen in which the particles are separated from the accompanying water, the said particles are subjected to reactivation in a fluidized bed reactor, and the said reactivated particles are redispersed in water and hydraulically conveyed to the top of the column.

3. A process as defined in claim 2 in which the temperature in the reactivation fluidized bed reactor is controlled in accordance with the amount of spent carbon particles discharged from the column of activated carbon particles per unit of time.

4. A process as defined in claim 1 in which the waste water is preliminarily filtered through a multilayer filter to remove any solid contaminants contained therein, the said filter being composed of a lower layer of sand, the particles of which range in size from 0.8 to 1.2 millimeters in diameter, and an upper layer of carbon particles ranging in size from 3 to 4 millimeters in diameter.

5. A process as defined in claim 2 in which the spent carbon particles that are withdrawn at the bottom of the column are preliminarily desorbed by being subjected to heating at a temperature between 300° and 500° C in the absence of molecular oxygen or oxidizing gases before being subjected to reactivation in the fluidized bed reactor.

6. A process as defined in claim 2 in which the spent carbon particles that are withdrawn at the bottom of the column are reactivated in the fluidized bed reactor with steam at a temperature of approximately 800° C.

7. A process as defined in claim 1 in which the activated carbon particles have an average size of between 0.5 and 2 millimeters in diameter.

8. A process for the purification of a contaminated fluid, comprising admitting the contaminated fluid into an inlet end of a bed of adsorbent particles; withdrawing the purified fluid from an outlet end of the bed; monitoring the degree of loading of the adsorbent particles with contaminants at a location which lies between about 30 and 70 percent of the distance from the inlet end to the outlet end of the bed; continuously withdrawing contaminant-loaded adsorbent particles from the bed during the adsorption of contaminants from the contaminated fluid at a rate depending upon the said degree of loading; reactivating the witdrawn contaminant-loaded adsorbent particles; and introducing the reactivated adsorbent particles into the bed.

9. A process as defined in claim 8 in which the contaminant-loaded particles are thermally reactivated and the temperature for the thermal reactivation is regulated in dependence upon the said degree of loading.

10. A process as defined in claim 9 in which the comtaminated fluid is filtered prior to being admitted into the bed and the filtration of the contaminated fluid, the adsorption of contaminants therefrom, the reactivation of the contaminant-loaded adsorbent particles and the introduction of the reactivated adsorbent particles into the bed are all performed continuously.

11. A process as defined in claim 8 in which the contaminated fluid and the adsorbent particles travel countercurrent to one another during the adsorption of contaminants from the contaminated fluid and the contaminated fluid, as well as the adsorbent particles, each travel at a rate which is substantially uniform over the entire cross-section of the bed.

12. A process as defined in claim 8 in which the contaminant-loaded adsorbent particles are thermally reactivated and the thermal reactivation is carried out immediately after withdrawal of the contaminant-loaded adsorbent particles from the bed and at a temperature which is regulated in dependence upon the quantity of contaminant-loaded adsorbent particles withdrawn from the bed per unit of time.

* * * * *